(12) United States Patent

Rooney et al.

(10) Patent No.: US 12,591,688 B2

(45) Date of Patent: Mar. 31, 2026

(54) CONTEXT-AWARE CRYPTOGRAPHIC INVENTORY

(71) Applicant: International Business Machines Corporation, Armonk, NY (US)

(72) Inventors: John G. Rooney, Zurich (CH); Christopher J. Giblin, Zurich (CH); Luis Garcés Erice, Rueschlikon (CH); Enrico Toniato, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 18/214,837

(22) Filed: Jun. 27, 2023

(65) Prior Publication Data

US 2025/0005163 A1 Jan. 2, 2025

(51) Int. Cl.
*G06F 21/57* (2013.01)
*H04L 9/40* (2022.01)

(52) U.S. Cl.
CPC .............. *G06F 21/577* (2013.01); *H04L 9/40* (2022.05); *H04L 63/1425* (2013.01); *G06F 2221/034* (2013.01)

(58) Field of Classification Search
CPC ... G06F 21/577; G06F 2221/034; H04L 9/40; H04L 63/1425
See application file for complete search history.

(56) References Cited

U.S. PATENT DOCUMENTS

| | | | |
|---|---|---|---|
| 2007/0271459 A1 | 11/2007 | Gomez | |
| 2019/0057145 A1* | 2/2019 | Huang | G06N 5/02 |
| 2023/0109545 A1* | 4/2023 | Wilkerson | H04L 9/3263 713/175 |
| 2023/0362017 A1* | 11/2023 | Fitzjarrell | H04L 9/14 |

FOREIGN PATENT DOCUMENTS

WO 2020233261 A1 11/2020

OTHER PUBLICATIONS

Bach et al., PromptSource: An Integrated Development Environment and Repository for Natural Language Prompts, Mar. 29, 2022.

(Continued)

*Primary Examiner* — Abdulkader M Alriyashi

(74) *Attorney, Agent, or Firm* — Garg Law Firm, PLLC; Rakesh Garg; Lily Neff

(57) ABSTRACT

An embodiment constructs a knowledge graph based on data received from a system wherein the knowledge graph comprises a plurality of entities and relationships among the plurality of entities which represent a context information of the knowledge graph. The embodiment assigns a unique identifier to a designated entity. The embodiment expresses in natural language the unique identifier, an associated label, an associated property name, an associated property value, an associated relationship label and an associated relationship property name. The embodiment trains, using a machine learning algorithm, a foundation model responsive to inputting the natural language expression and applying a prompt comprising a cryptographic criterion, wherein the foundation model is trained to solve a task associated with the cryptographic criterion.

20 Claims, 7 Drawing Sheets

(56) References Cited

OTHER PUBLICATIONS

Agarwal et al., Knowledge Graph Based Synthetic Corpus Generation for Knowledge-Enhanced Language Model Pre-training, Mar. 13, 2021.

Badr, Instant-Hybrid Neural-Cryptography (IHNC) based on fast machine learning, Jul. 13, 2022.

Narayan et al., Can Foundation Models Wrangle Your Data?, Dec. 24, 2022.

Hertling et al., KERMIT—A Transformer-Based Approach for Knowledge Graph Matching, Apr. 29, 2022.

Chen et al., HittER: Hierarchical Transformers for Knowledge Graph Embeddings, Proceedings of the 2021 Conference on Empirical Methods in Natural Language Processing, pp. 10395-10407, Nov. 7-11, 2021.

Born et al., Regression Transformer: Concurrent sequence regression and generation for molecular language modeling, Nov. 11, 2022.

Christofidellis et al., PGT: a prompt based generative transformer for the patent domain, ICML workshop on Knowledge Retrieval and Language Models, 2022.

Sanh et al., Multitask Prompted Training Enables Zero-Shot Task Generalization, Mar. 17, 2022.

Born et al., Regression Transformer: Concurrent Conditional Generation and Regression by Blending Numerical and Textual Tokens, Feb. 1, 2022.

"NIST Cyber Risk Scoring (CRS)", Program Overview, Feb. 2021, 38 pages.

NIST "Guide for Conducting Risk Assessments", Joint Task Force Transformation Initiative, Information Security, Sep. 2012, 95 pages.

* cited by examiner

Figure 4:
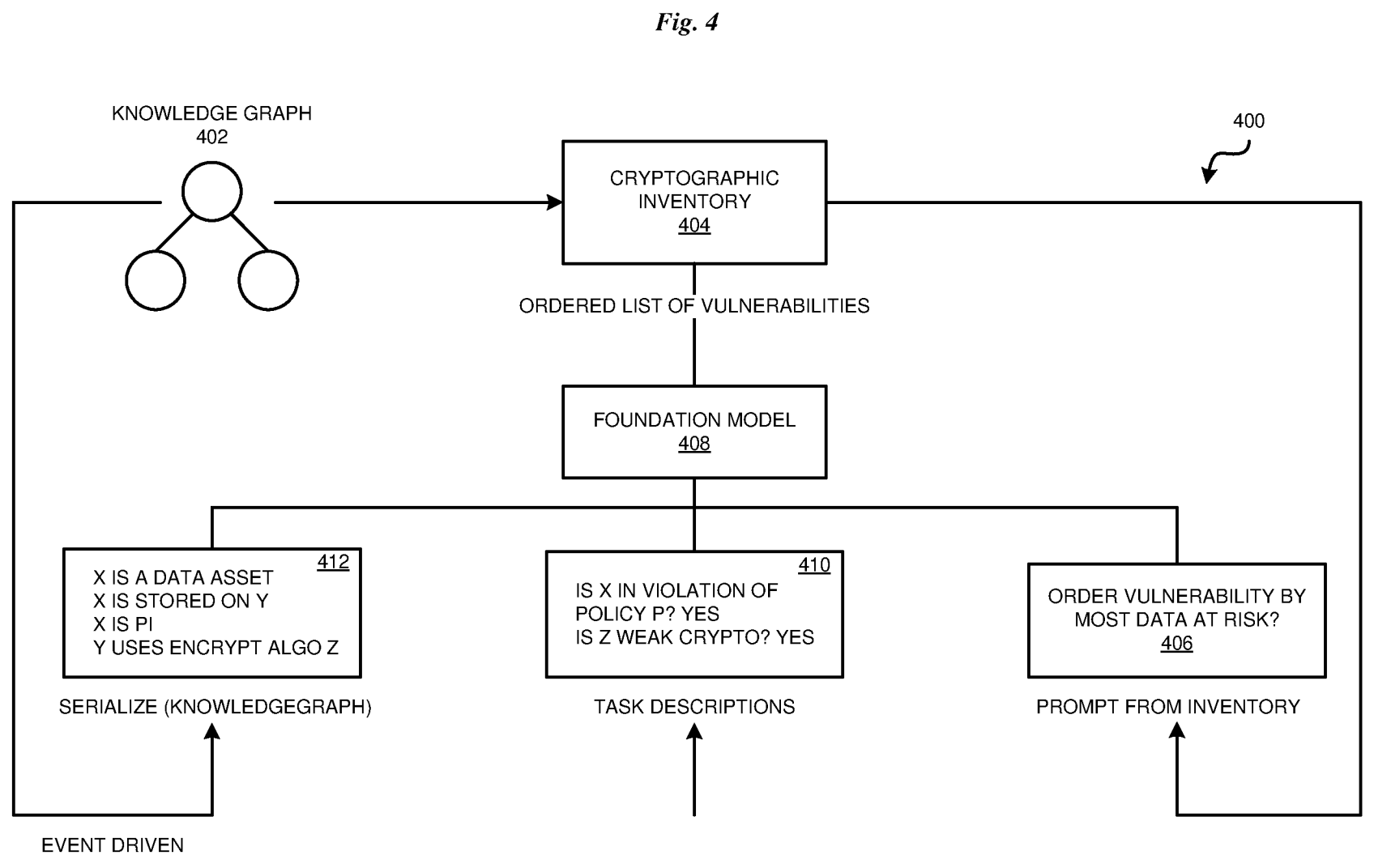

KNOWLEDGE GRAPH
402

CRYPTOGRAPHIC
INVENTORY
404

ORDERED LIST OF VULNERABILITIES

FOUNDATION MODEL
408

ORDER VULNERABILITY BY
MOST DATA AT RISK?
406

PROMPT FROM INVENTORY

IS X IN VIOLATION OF
POLICY P? YES
IS Z WEAK CRYPTO? YES
410

TASK DESCRIPTIONS

X IS A DATA ASSET
X IS STORED ON Y
X IS PI
Y USES ENCRYPT ALGO Z
412

SERIALIZE (KNOWLEDGEGRAPH)

EVENT DRIVEN

500

CREATE TASK DESCRIPTIONS
502

USER INTERACTION
IN CRYPTO INVENTORY
504

CREATE PROMPT
506

SERIALIZED CHANGED
PART OF GRAPH
508

UPDATE KNOWLEDGE GRAPH
510

CHANGE EVENT
512

RUN LANGUAGE MODEL
514

CONNECT REPLY TO KG
516

VISUALIZE REPLY
CONNECTED TO KG CONTEXT
518

CONTEXT-AWARE CRYPTOGRAPHIC INVENTORY

BACKGROUND

The present invention relates generally to artificial intelligence (AI). More particularly, the present invention relates to a method, system, and computer program for Context-Aware Cryptographic Inventory.

A cryptographic inventory is a system-of-record which describes the cryptographic artifacts that are used to protect systems and/or data. Cryptographic inventories are a relatively recent development in government and private industry. Such an inventory enables an organization, such as an enterprise, to mandate and monitor cryptographic policy across the organization's infrastructure. Examples of cryptographic artifacts are keys, digital certificates, cipher suites, protocols, encryption algorithms, etc.

However, existing inventories do not provide the complete context of the systems stored in the inventory. For example, in addition to enumerating technical information about cryptographic assets, existing inventories do not show which data is stored on the system, the processes running on that system, or the other systems that they link to and interact with.

SUMMARY

The illustrative embodiments provide for a Context-Aware Cryptographic Inventory. An embodiment includes constructing a knowledge graph based on data received from a system wherein the knowledge graph comprises a plurality of entities and relationships among the plurality of entities representing a context information of the knowledge graph. The embodiment also includes assigning a unique identifier to a designated entity. The embodiment also includes expressing in natural language the unique identifier, an associated label, an associated property name, an associated property value, an associated relationship label and an associated relationship property name. The embodiment also includes training, using a machine learning algorithm, a foundation model responsive to inputting the natural language expression and applying a prompt comprising a cryptographic criterion, wherein the foundation model is trained to solve a task associated with the cryptographic criterion. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 4 depicts a diagram of an example of Context-Aware Cryptographic Inventory environment in accordance with an illustrative embodiment;

DETAILED DESCRIPTION

Figure 1:
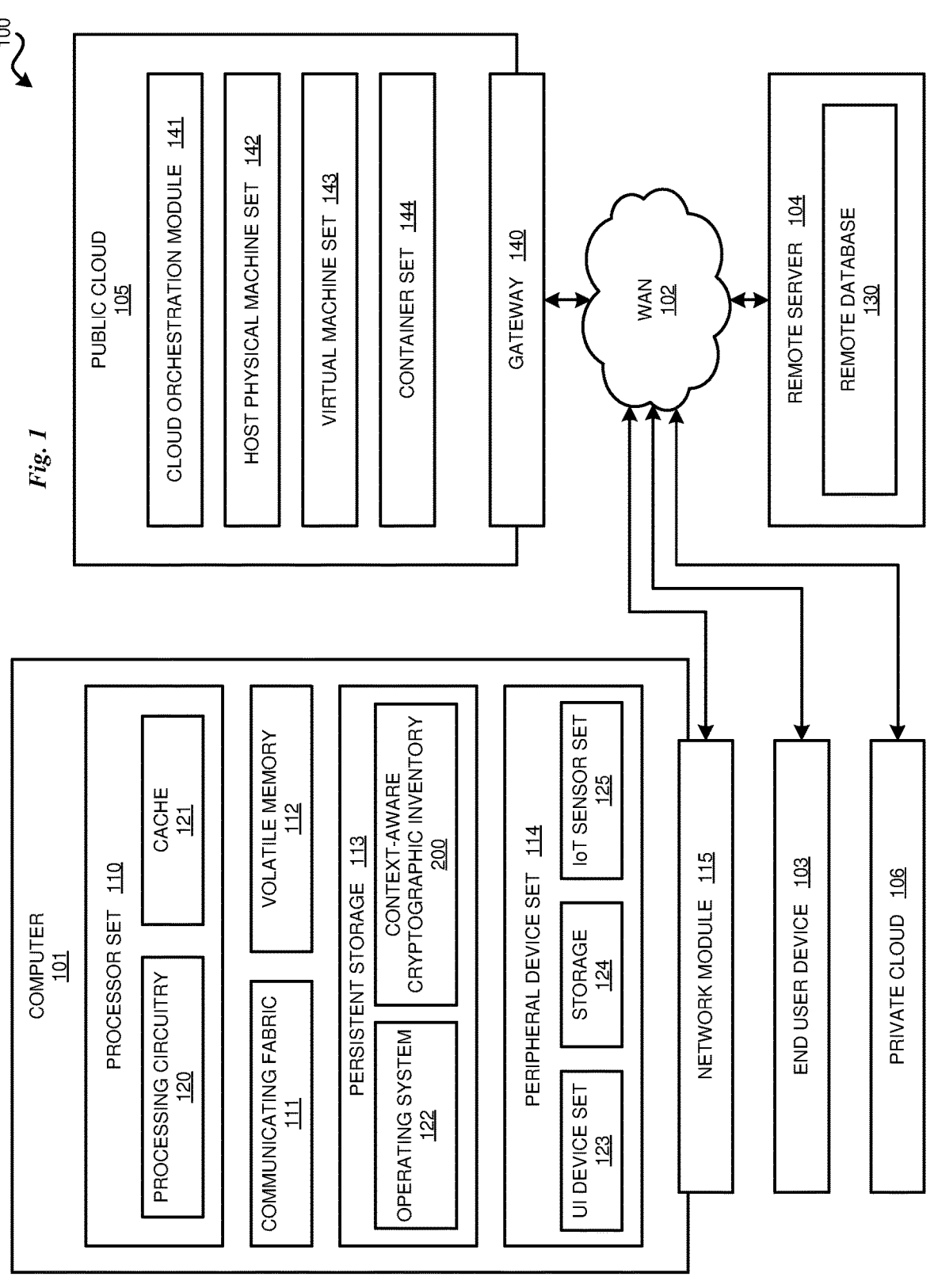
FIG. 1 depicts a block diagram of a computing environment in accordance with an illustrative embodiment.

A cryptographic inventory is a system-of-record which describes the cryptographic artifacts that are used to protect systems and/or data. Cryptographic inventories are a relatively recent development in government and private industry. Such an inventory enables an organization, such as an enterprise, to mandate and monitor cryptographic policy across the organization's infrastructure. Examples of cryptographic artifacts are keys, digital certificates, cipher suites, protocols, encryption algorithms, etc.

Cryptographic inventories are often generated from automatic scans of the systems recorded in the inventory. The inventory appears as list of systems showing, for example, the cryptographic algorithms used for both data at rest and in-flight. What existing inventories do not allow is to give the complete context of the systems stored in the inventory. For example, in addition to enumerating technical information about cryptographic assets, existing inventories do not show which data is stored on the system, the processes running on that system, or the other systems that they link to and interact with etc.

Understanding the context is essential to optimize decisions according to factors such as the criticality of systems or the most effective use of resources required to patch, migrate and maintain cryptographic standards. There is also an initiative to make systems quantum safe, i.e. to migrate to protecting data using cryptography that would be resistant against a future quantum computer.

Currently there is no way to dynamically create a Context-Aware Cryptographic Inventory. Current efforts do not allow cryptographic inventories to have the complete context of the systems stored in the inventory.

The present disclosure addresses the deficiencies described above by providing a method, a machine-readable medium, and a system that constructs a knowledge graph based on data received from a system wherein the knowledge graph comprises a plurality of entities and relationships among the plurality of entities representing a context information of the knowledge graph; assigns a unique identifier to a designated entity; expressing in natural language the unique identifier, an associated label, an associated property name, an associated property value, an associated relationship label and an associated relationship property name; and trains using a machine learning algorithm, a foundation model responsive to inputting the natural language expression and applying a prompt comprising a cryptographic criterion, wherein the foundation model is trained to solve a task associated with the cryptographic criterion.

The illustrative embodiments provide for Context-Aware Cryptographic Inventory. A cryptographic inventory is a strategic cybersecurity asset. It enables an organization to enforce a secure cryptographic policy across IT infrastructure; react quickly to security issues; efficiently carry out strategic transformations, such as migrating cryptography services to the cloud, or deploying post-quantum cryptography. however, use of this example is not intended to be limiting, but is instead used for descriptive purposes only.

Illustrative embodiments include wherein the cryptographic criterion comprises a cryptographic vulnerability.

Illustrative embodiments include wherein the knowledge graph further comprises data representative of an ordered list of vulnerabilities wherein the order of the list of vulnerabilities is determined from context information of the knowledge graph.

Illustrative embodiments include wherein the training the foundation model further comprises inputting a prompt generated from the knowledge graph into the foundation model.

Illustrative embodiments include wherein the training the foundation model further comprises inputting a task description generated from the knowledge graph into the foundation model.

Illustrative embodiments include wherein data received from a system comprises a description of keys, a description of digital certificates, a description of cipher suites, a description of protocols, a description of encryption algorithms or compliance regulations.

Illustrative embodiments also include further comprising generating a prompt in response to a user request, inputting the prompt into the foundation model, updating the knowledge graph with a result from the foundation model and outputting a response to the user.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as a Context-Aware Cryptographic Inventory module 200 that provides overflow of on-premises workloads onto secure cloud hosts in the nearby region. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

The process software Context-Aware Cryptographic Inventory is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 2:
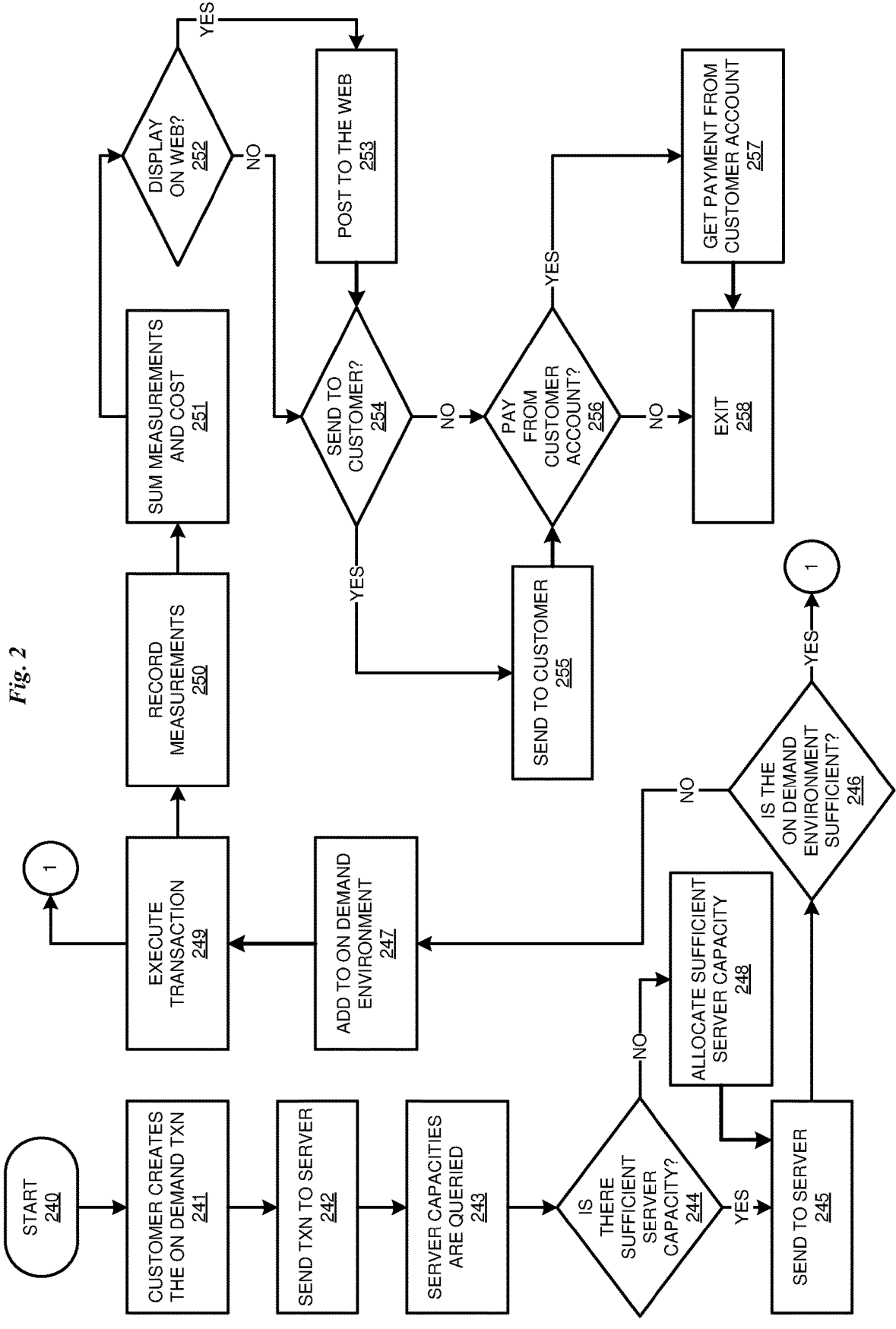
FIG. 2 depicts a flowchart diagram of an example On Demand process in accordance with an illustrative embodiment.

FIG. 2 depicts a flowchart diagram of an example On Demand process in accordance with an illustrative embodiment.

Step 240 begins the On Demand process. A transaction is created that contains the unique customer identification, the requested service type, and any service parameters that further specify the type of service (241). The transaction is then sent to the main server (242). In an On Demand environment, the main server can initially be the only server, and then as capacity is consumed other servers are added to the On Demand environment.

The server central processing unit (CPU) capacities in the On Demand environment are queried (243). The CPU requirement of the transaction is estimated, and then the server's available CPU capacity in the On Demand environment is compared to the transaction CPU requirement to see if there is sufficient CPU available capacity in any server to process the transaction (244). If there is not sufficient server CPU available capacity, then additional server CPU capacity is allocated to process the transaction (248). If there was already sufficient available CPU capacity, then the transaction is sent to a selected server (245).

Before executing the transaction, a check is made of the remaining On Demand environment to determine if the environment has sufficient available capacity for processing the transaction. This environment capacity consists of such things as, but not limited to, network bandwidth, processor memory, storage etc. (246). If there is not sufficient available capacity, then capacity will be added to the On Demand environment (247). Next the required software to process the transaction is accessed, loaded into memory, and then the transaction is executed (249).

The usage measurements are recorded (250). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (251).

If the customer has requested that the On Demand costs be posted to a web site (252), then they are posted thereto (253). If the customer has requested that the On Demand costs be sent via e-mail to a customer address (254), then they are sent (255). If the customer has requested that the On Demand costs be paid directly from a customer account (256), then payment is received directly from the customer account (257). On Demand process proceeds to 258 and exits.

While it is understood that the process software Context-Aware Cryptographic Inventory may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

INTRODUCTION

Loading the process software directly on the client, server, and proxy computers by loading a storage medium such as a CD, DVD, etc.

Automatically or semi-automatically deploying the process software into a computer system by sending it to a central server or a group of central servers. The process software is then downloaded into the client computers that will execute the process software.

Sending the process software directly to the client system via e-mail. The process software is then either detached to a directory or loaded into a directory by executing a set of program instructions that detaches the process software into a directory.

Sending the process software directly to a directory on the client computer hard drive.

When there are proxy servers, the process will select the proxy server code, determine on which computers to place the proxy servers' code, transmit the proxy server code, and then install the proxy server code on the proxy computer. The process software will be transmitted to the proxy server and then it will be stored on the proxy server.

General Description

While it is understood that the process software Context-Aware Cryptographic Inventory may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Figure 3:
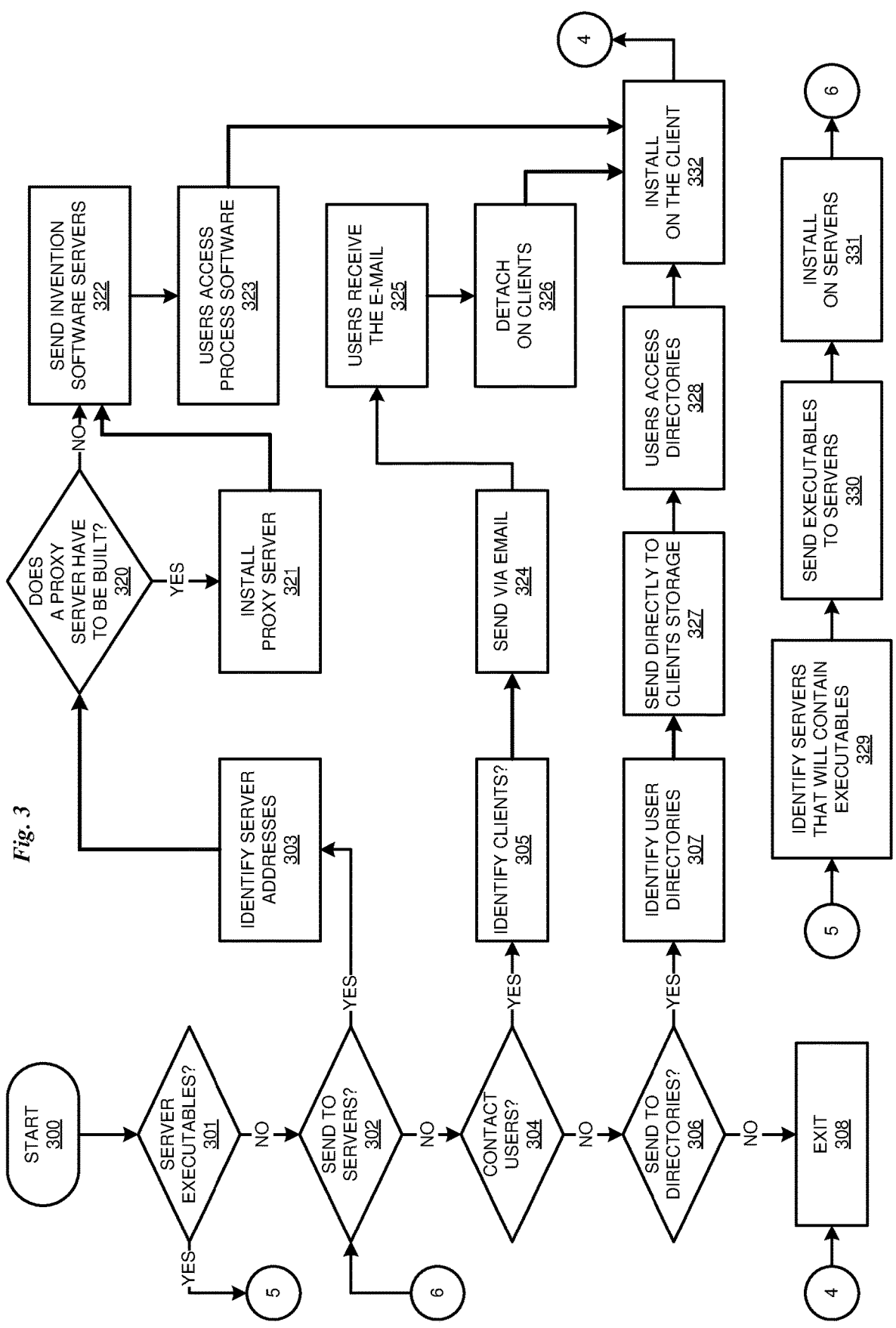
FIG. 3 this figure depicts a flowchart diagram of an example Deployment process in accordance with an illustrative embodiment.

FIG. 3 this figure depicts a flowchart diagram of an example Deployment process in accordance with an illustrative embodiment.

Step 300 begins the deployment of the process software. An initial step is to determine if there are any programs that will reside on a server or servers when the process software is executed (301). If this is the case, then the servers that will contain the executables are identified (329). The process software for the server or servers is transferred directly to the servers' storage via FTP or some other protocol or by copying though the use of a shared file system (330). The process software is then installed on the servers (301).

Next, a determination is made on whether the process software is to be deployed by having users access the process software on a server or servers (302). If the users are to access the process software on servers, then the server addresses that will store the process software are identified (303).

A determination is made if a proxy server is to be built (320) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (321). The process software is sent to the (one or more) servers either via a protocol such as FTP, or it is copied directly from the source files to the server files via file sharing (322). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (323). Another embodiment is to have the servers automatically copy the process software to each client and then run the installation program for the process software at each client computer. The user executes the program that installs the process software on his client computer (332) and then exits the process (308).

In step 304 a determination is made whether the process software is to be deployed by sending the process software to users via e-mail. The set of users where the process software will be deployed are identified together with the addresses of the user client computers (305). The process software is sent via e-mail to each of the users' client computers. The users then receive the e-mail (325) and then detach the process software from the e-mail to a directory on their client computers (326). The user executes the program that installs the process software on his client computer (332) and then exits the process (308).

Lastly, a determination is made on whether the process software will be sent directly to user directories on their client computers (306). If so, the user directories are identified (307). The process software is transferred directly to the user's client computer directory (327). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (328). The user executes the program that installs the process software on his client computer (332) and then exits the process (308).

With reference to FIG. 4, this figure depicts a block diagram of an exemplary Context-Aware Cryptographic Inventory module 400 in accordance with an illustrative embodiment. In the illustrated embodiment, the Context-Aware Cryptographic Inventory module 400 is an example of the Context-Aware Cryptographic Inventory module 200 of FIG. 1.

In an example embodiment, the Knowledge Graph 410 comprises a Cryptographic Inventory 420. The entities and the relationships among the entities in the Knowledge Graph 410, which represent the context information of the Knowledge Graph, are serialized as natural language expressions and inputted into the Foundation Model 408. The Foundation Model 408 may be trained for example using machine learning algorithm with the natural language expressions. In another example, the Foundation Model learns from a task description 410 such as "zero-shot", the prompt is the task description and the example to complete. In yet another example, the training may be achieved by a cryptographic criterion prompt 406 such as "few shots" i.e. a small number of example answers to the same prompt over the natural language expressions where the prompt adds demonstrations of how to complete the task or "zero shots" i.e. there is no training.

Figure 5:
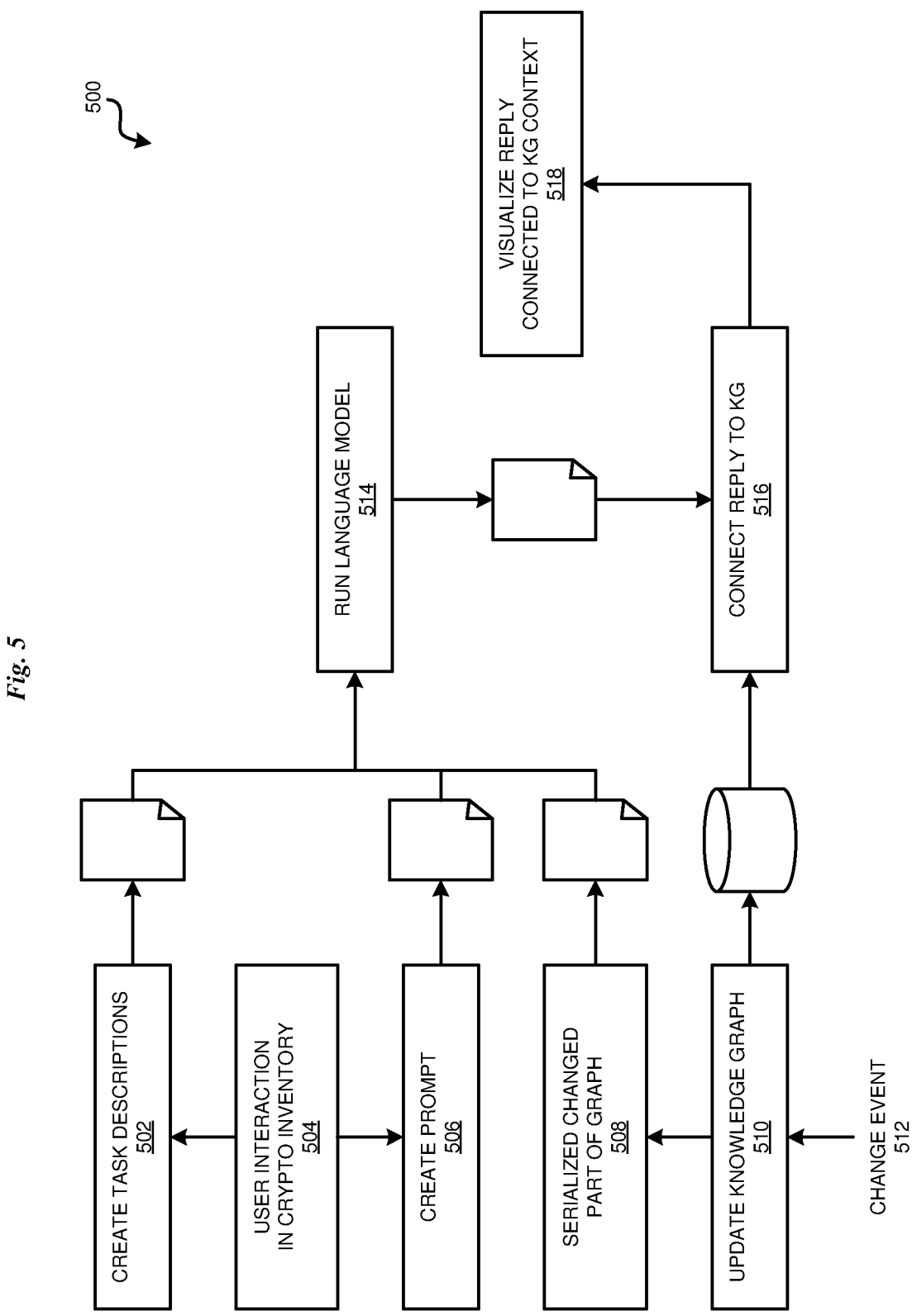
FIG. 5 depicts a flow chart of an operation of the Context-Aware Cryptographic Inventory module in accordance with an illustrative embodiment.

With reference to FIG. 5, this figure depicts a flow chart of an exemplary Context-Aware Cryptographic Inventory module 500 in accordance with an illustrative embodiment. In the illustrated embodiment, the Context-Aware Cryptographic Inventory module 500 is an example of the Context-Aware Cryptographic Inventory module 200 of FIG. 1.

In an embodiment, a user activity in the inventory 504 creates a task description 502 inputted into a foundation model 514 wherein executing a machine learning algorithm result in a reply via the knowledge graph 516 and visually displayed 518. In another embodiment, a user activity in the inventory 504 creates a prompt 506 inputted into a foundation model 514 wherein executing a machine learning algorithm result in a reply via the knowledge graph 516 and visually displayed 518. In an embodiment, the result from the foundation model of executing a machine learning algorithm adds more context information to the knowledge graph.

In another embodiment, a change event 512 for example a change to a system is serialized as natural language expression 508, causes an update of the knowledge graph 510 inputted into a foundation model 514 wherein executing a machine learning algorithm result in a reply via the knowledge graph 516 and visually displayed with context 518. In an embodiment, the result from the foundation model of executing a machine learning algorithm adds more context information to the knowledge graph.

Figure 6:
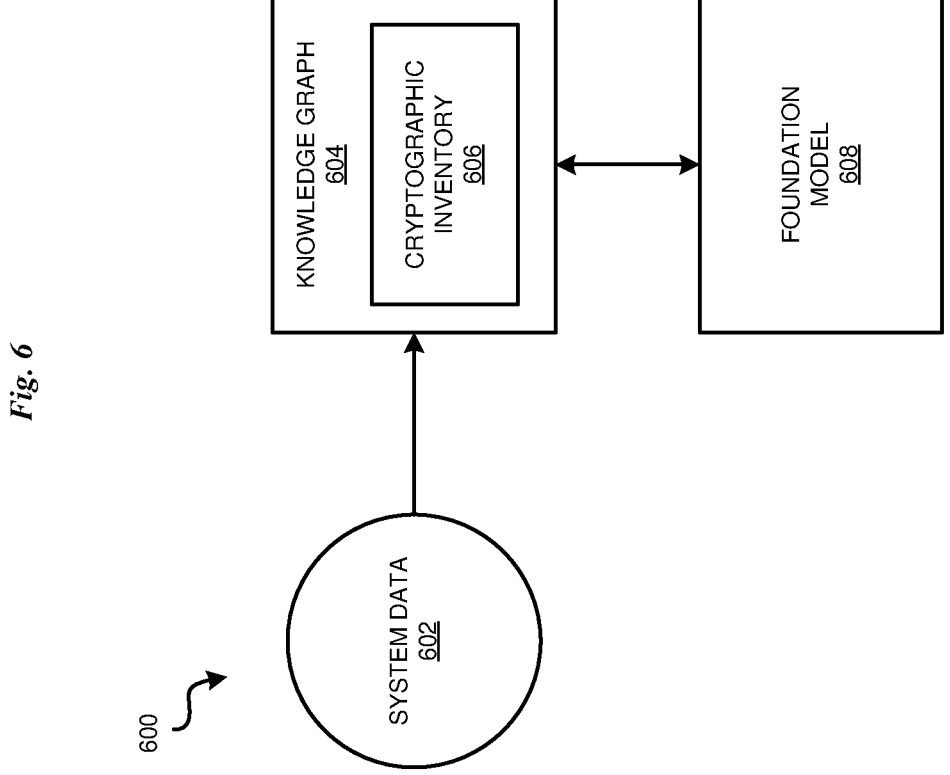
FIG. 6 depicts a block diagram of the components of a Context-Aware Cryptographic Inventory module in accordance with an illustrative embodiment.

With reference to FIG. 6, this figure depicts a block diagram of a component 600 of an exemplary Context-Aware Cryptographic Inventory module in accordance with an illustrative embodiment. In the illustrated embodiment, the knowledge graph 700 is an example of the knowledge graph in the Context-Aware Cryptographic Inventory module 200 of FIG. 1.

In an embodiment, the Knowledge Graph 604 receives data from a system 602. The inventory 606 is constructed from the entities and relationships of the Knowledge Graph 604 as herein described in the embodiments. The Knowledge Graph entities are converted to natural language expressions and inputted into a Foundation Model 608. Training of the Foundation Model may also be accomplished with a task description or a prompt. In another embodiment, the context information of the Knowledge Graph may be enhanced from the foundation model.

Figure 7:
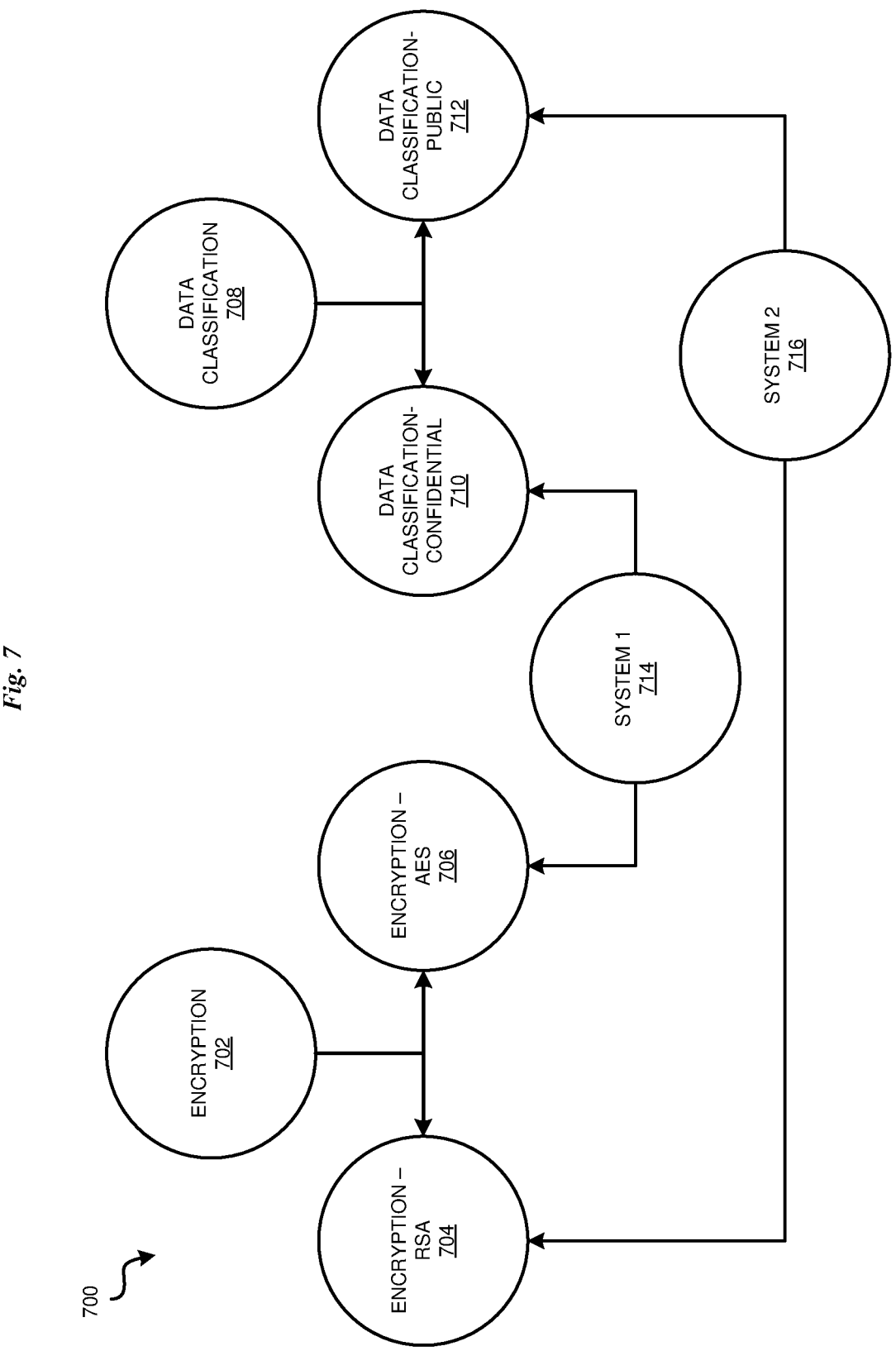
FIG. 7 depicts a diagram of an example of a knowledge graph environment in accordance with an illustrative embodiment.

With reference to FIG. 7, this figure depicts a block diagram of a knowledge graph 700 of an exemplary Context-Aware Cryptographic Inventory module in accordance with an illustrative embodiment. In the illustrated embodiment, the knowledge graph 700 is an example of the knowledge graph in the Context-Aware Cryptographic Inventory module 604 of FIG. 6.

In an embodiment, system1 714 is a system entity, having relationships with EncryptionAES 706 and DataClassification 710. System2 716 has relationships with EncryptionRSA 704 and DataClassification 712.

In an embodiment, the representation of a Knowledge Graph is as a labeled property graph constructed from data received from a system wherein the knowledge graph comprises of a plurality of entities in the system and relationships among the plurality of entities in the system, wherein entities correspond to vertices in the graph, and relationships between entities correspond to edges between vertices in the graph. Assuming the existence of a directed graph with vertices V and directed edges E such that E is a subset of {(x:V,y:V)} where x and y are vertices connected by an edge. Without loss of generality the graph is represented as a labelled property graph, such that vertices and edge have many labels and properties associated with them, however, use of this example is not intended to be limiting, but is instead used for descriptive purposes only.

In an embodiment, the contents of the Knowledge Graph are converted into natural language expressions and stored as a corpus. This text corpus is used to train a foundation model, creating a system combining the technical context established in the Knowledge Graph with general knowledge from the foundation model.

As an example, below is the set of rules for converting the Knowledge Graph comprising:

For every vertex a unique identifier x is created,

For every label associated with that vertex we generate the statement "x is a <LABELNAME>"

For every property associated with vertex we generate the statement "x has property <PROPERTYNAME> with value <PROPERTYVALUE>

For every Relationship/Label between x and y we generate the statement "x is related to y with relationship <LABELNAME>"

For every property associated with the relationship between x and y we generate the statement "The relationship between x and y has property <PROPERTYNAME>"

All the resulting statements are concatenated resulting in a textual context information representation of the graph. The order of the statements is not important as they simply state facts inferred from the graph, i.e. the order of the following statements is not important:

"X is a Database Table",

"X has property Data Classification with value Confidential"

"X is encrypted with AES"

In an embodiment, simple statements about a domain may be expressed using either a Labelled Property Graphs (LPG) or Resource Description Framework (RDF) and more complex relationships to be inferred from the language model, i.e. the language model knows that Log 4j is a Java software package without this been necessary directly stated in the graph's data model.

Different text corpuses generated from different graphs can be combined by giving a context:

"X is a System dependent on CryptoGraphic asset with Vulnerability V According to Graph G1"

Statement can be made contingent by adding a time aspect

"X is a System dependent on CryptoGraphic Z asset with Vulnerability V According to Graph G1 at Time T1"

This in turn allows deletions within the graph, i.e. if X is deleted then:

"X is a System NOT dependent on CryptoGraphic Z asset with Vulnerability V According to Graph G1 at Time T2"

In an embodiment, the cryptographic criterion comprises the vulnerabilities that expose the most important data of a system. These vulnerabilities may be drawn from multiple different sources including but not limited to access logs, system scans, governance catalogs, workflow orchestrators, software repositories, vulnerability databases etc. Cryptographic assets are treated as first-class entities within this knowledge graph. The inventory describes not only the cryptographic assets discovered, but also allows inspection within the graph, for example allowing the systems, workflows and data that are put at risk as a consequence of the vulnerability.

The priority list or ordered list is extracted by applying analytics to the context information. The user can then customize the prioritization either through pre-defined analytics or via user defined extensions. For example, these include, but are not limited to prioritizing vulnerabilities that:

put the most important data at risk, put the greatest quantity of data at risk, are the most easily exploitable by an attack (given the external exposure of the systems affected)

are the most expedient to remediate (because they affect the least amount of software developed at the company)

These priorities are generated from specific analytics applied to the context in which the cryptographic inventory item exists. The embodiments described herein allow users to add specific analytics such that the priority list is customizable by the user.

A foundation model created from a large language model is used as support to interpret the text. A small number of "few shot" prompts can be applied to this model to help in the learning.

As an example, a Knowledge graph may contain:

a description of the physical infrastructure of the data systems of an enterprise a description of the distributed workflows that run on that infrastructure a description of the data assets consumed/produced by workflows a description of the cryptographic assets associated with the entities in the system a description of the cryptographic vulnerabilities associated with the cryptographic assets An example prompt to the system could be "what vulnerabilities put at risk the most important data"

A key advantage is that the system with no task-specific training can answer questions solely relying on a limited set of related training examples.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
serializing by expressing in natural language (NL) a knowledge graph comprising a plurality of entities and a plurality of relationships among the plurality of entities, the plurality of relationships providing a cryptographic context of the knowledge graph, the cryptographic context being represented as a cryptographic inventory in the knowledge graph, the serializing outputting a serialized NL knowledge graph;
inputting, into a foundation model, the serialized NL knowledge graph;
executing the foundation model using a first prompt input corresponding to a task description relative to the serialized NL knowledge graph and further relative to the cryptographic inventory, the first prompt input comprising a cryptographic criterion, the executing producing a trained foundation model capable of answering zero-shot questions about the cryptographic context;
executing the trained foundation model with a second prompt input, the second prompt input corresponding to an unknown task on which the trained foundation model has not been trained;
outputting responsive to executing the trained foundation model, a response, the response being based on the cryptographic context; and
visually rendering on a display apparatus, a visualization of the response in relation to the cryptographic context.

2. The computer-implemented method of claim 1, wherein the cryptographic criterion comprises a cryptographic vulnerability.

3. The computer-implemented method of claim 1, wherein executing the first prompt input relative to the cryptographic inventory is further relative to an ordered list of vulnerabilities wherein an order of the ordered list of vulnerabilities is determined from the context of the knowledge graph.

4. The computer-implemented method of claim 1, wherein the first prompt input is generated from the knowledge graph.

5. The computer-implemented method of claim 1, wherein the task description comprises an ordering of a cryptographic vulnerability according to the knowledge graph.

6. The computer-implemented method of claim 1, wherein the knowledge graph is constructed from data received from a system, the data comprising a description of keys, a description of digital certificates, a description of cipher suites, a description of protocols, a description of encryption algorithms or compliance regulations.

7. The computer-implemented method of claim 1, further comprising:
generating a third prompt in response to a user request;
inputting the third prompt into the trained foundation model;
updating the knowledge graph with a result from the trained foundation model; and
outputting a response to the user wherein the result from the trained foundation model adds to the context of the knowledge graph.

8. A computer program product comprising one or more computer readable storage media, and program instructions collectively stored on the one or more computer readable storage media, the program instructions executable by a processor to cause the processor to perform operations comprising:
serializing by expressing in natural language (NL) a knowledge graph comprising a plurality of entities and a plurality of relationships among the plurality of entities, the plurality of relationships providing a cryptographic context of the knowledge graph, the cryptographic context being represented as a cryptographic inventory in the knowledge graph, the serializing outputting a serialized NL knowledge graph;
inputting, into a foundation model, the serialized NL knowledge graph;
executing the foundation model using a first prompt input corresponding to a task description relative to the serialized NL knowledge graph and further relative to the cryptographic inventory, the first prompt input comprising a cryptographic criterion, the executing producing a trained foundation model capable of answering zero-shot questions about the cryptographic context;
executing the trained foundation model with a second prompt input, the second prompt input corresponding to an unknown task on which the trained foundation model has not been trained;
outputting responsive to executing the trained foundation model, a response, the response being based on the cryptographic context; and
visually rendering on a display apparatus, a visualization of the response in relation to the cryptographic context.

9. The computer program product of claim 8, wherein the cryptographic prioritization criterion comprises a cryptographic vulnerability.

10. The computer program product of claim 8, wherein the first prompt input is generated from the knowledge graph.

11. The computer program product of claim 8, wherein executing the first prompt input relative to the cryptographic inventory is further relative to an ordered list of vulnerabilities wherein an order of the ordered list of vulnerabilities is determined from the context of the knowledge graph.

12. The computer program product of claim 8, wherein the task description comprises an ordering of a cryptographic vulnerability according to the knowledge graph.

13. The computer program product of claim 8, further comprising:
generating a third prompt in response to a user request;
inputting the third prompt into the trained foundation model;
updating the knowledge graph with a result from the trained foundation model; and outputting a response to the user wherein the result from the trained foundation model adds to the context of the knowledge graph.

14. The computer program product of claim 8, wherein the knowledge graph is constructed from data received from a system, the data comprising a description of keys, a description of digital certificates, a description of cipher suites, a description of protocols, a description of encryption algorithms or compliance regulations.

15. A computer system comprising a processor and one or more computer readable storage media, and program instructions collectively stored on the one or more computer readable storage media, the program instructions executable by the processor to cause the processor to perform operations comprising:

serializing by expressing in natural language (NL) a knowledge graph comprising a plurality of entities and a plurality of relationships among the plurality of entities, the plurality of relationships providing a cryptographic context of the knowledge graph, the cryptographic context being represented as a cryptographic inventory in the knowledge graph, the serializing outputting a serialized NL knowledge graph;

inputting, into a foundation model, the serialized NL knowledge graph;

executing the foundation model using a first prompt input corresponding to a task description relative to the serialized NL knowledge graph and further relative to the cryptographic inventory, the first prompt input comprising a cryptographic criterion, the executing producing a trained foundation model capable of answering zero-shot questions about the cryptographic context;

executing the trained foundation model with a second prompt input, the second prompt input corresponding to an unknown task on which the trained foundation model has not been trained;

outputting responsive to executing the trained foundation model, a response, the response being based on the cryptographic context; and visually rendering on a display apparatus, a visualization of the response in relation to the cryptographic context.

16. The computer system of claim 15, wherein the cryptographic criterion comprises a cryptographic vulnerability.

17. The computer system of claim 15, wherein the first prompt input is generated from the knowledge graph.

18. The computer system of claim 15, wherein executing the first prompt input relative to the cryptographic inventory is further relative to an ordered list of vulnerabilities wherein an order of the ordered list of vulnerabilities is determined from the context of the knowledge graph.

19. The computer system of claim 15, wherein the task description comprises an ordering of a cryptographic vulnerability according to the knowledge graph.

20. The computer system of claim 15, further comprising:

generating a third prompt in response to a user request;

inputting the third prompt into the trained foundation model;

updating the knowledge graph with a result from the trained foundation model; and outputting a response to the user wherein the result from the trained foundation model adds to the context of the knowledge graph.

* * * * *